Oct. 29, 1968    R. SCHAYES ET AL    3,408,495
THERMO-LUMINESCENT DOSIMETER COMPRISING TWO PARTS MOUNTED
IN A COMMON EVACUATED SPACE
Filed Jan. 26, 1966
3 Sheets-Sheet 1

INVENTORS
RAYMOND SCHAYES
ISIDORE KOZLOWITZ
BY
Frank R. Trifari
AGENT

Oct. 29, 1968  R. SCHAYES ETAL  3,408,495
THERMO-LUMINESCENT DOSIMETER COMPRISING TWO PARTS MOUNTED
IN A COMMON EVACUATED SPACE
Filed Jan. 26, 1966  3 Sheets-Sheet 3

INVENTORS
RAYMOND SCHAYES
ISIDORE KOZLOWITZ
BY
AGENT

United States Patent Office 3,408,495
Patented Oct. 29, 1968

3,408,495
THERMO-LUMINESCENT DOSIMETER COMPRISING TWO PARTS MOUNTED IN A COMMON EVACUATED SPACE
Raymond Schayes and Isidore Kozlowitz, Brussels, Belgium, assignors to Societe Anonyme, Manufacture Belge de Lampes et de Materiel Electronique, Brussels, Belgium
Filed Jan. 26, 1966, Ser. No. 523,106
Claims priority, application Belgium, Jan. 29, 1965, 659,086
9 Claims. (Cl. 250—71)

ABSTRACT OF THE DISCLOSURE

A thermoluminescent device comprising two parts in a common evacuated space, each part comprising an active substance and a support. Each of the substances is provided with means to heat the substance causing it to luminesce but the resistance to a rise in temperature of the surfaces of the two parts is different in order that information collected by each part at different instants can be withdrawn so that one of the substances can thus indicate the total radiation received successively by the device.

---

The invention relates to a thermo-luminescent dosimeter.

Dosimeters of the type to which the invention relates are used for various types of radiation and comprise an active substance which is provided on a support. After the irradiation of a substance the temperature is gradually raised which is effected, in general, by heating the support. At a sufficiently high temperature the substance shows luminescence, this being a measure of the absorbed dose of rays. The measured result may relate to the amplitude of a thermo-luminescent peak which appears in the case of a progressive heating or to the integrated luminescence. These phenomena are known and for their study and for the description of known measuring cells reference is made to the literature.

These cells have the drawback that a measurement cannot be repeated. The heating which is required for measuring the dose of rays results in a destruction of the information stored in the active substance and in certain cases this may present drawbacks. To mitigate the drawback two identical dosimeters may be exposed to the same radiation and only the information of one of the two dosimeters may be used, while the other dosimeter remains available, to determine, after some time, the total dose of the radiation which is received by the two cells but of which the first is used for numerous measurements and each time after a radiation the associated dose is determined. This method has the drawback that two different dosimeters generally cannot be compared with one another. They may differ in sensitivity while in the case of separate cells it is not ensured that the two dosimeters have been exposed to the same radiation under the said conditions.

It is the object of the invention to avoid the said drawbacks. According to the invention at least two parts are provided in the same space, each part comprising an active substance and a support, the resistance against the rise in temperature of the surface of the two parts being different in order to withdraw the information collected by each part at different instants, so that one of the substances can thus indicate the total radiation received successively by the apparatus.

In a preferred embodiment of the invention, certain thermal parameters of the parts in question are different so that the temperature of each layer of the thermal luminescent substance follows a line of behavior dependent upon time which differs from others. The active substances of the two parts may be the same and show the same behavior, or the two parts may consist of different substances. The two supports may be individual members or may constitute one assembly.

Figures 6, 7:
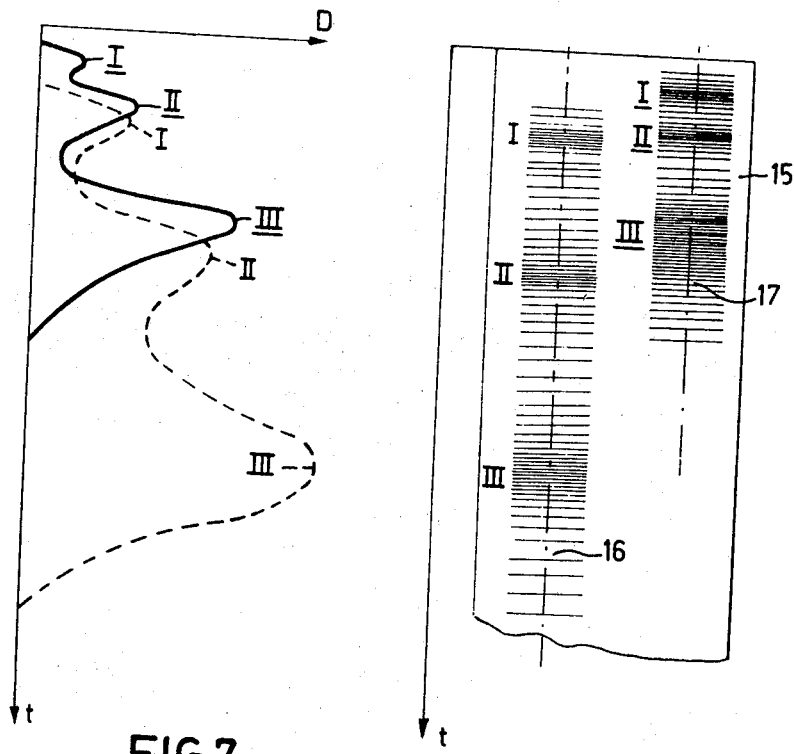

The invention will now be described with reference to the accompanying drawing, in which FIGS. 1 to 5 are axial cross-sectional views of the various embodiments of a dosimeter according to the invention, and FIGS. 6 and 7 show diagrams which will be discussed later.

Every cell shown by way of example comprises a tubular support 1. This may be constructed as one unit or as two members connected together. The thermo-luminescent active substance 2 is provided on the support at two surface portions. An electric filament 3 is axially arranged in the tube 1. The said parts are arranged inside a glass envelope 4, which may be evacuated and which is permeable to fluorescent radiation. A current circuit provided with a current source 5 and a switch 6 serves for heating the filament. If after irradiation of the active substance 2, the switch 6 is closed, the current flows through the filament 3 which radiates heat to the tube 1. This tube heats the active substance 2 by conduction.

Heating of the two surface layers 7 and 8 consisting of the active substance 2 must be different namely so that luminescence of one layer takes place after the other layer has already reached the temperature required for that purpose.

Figure 1:
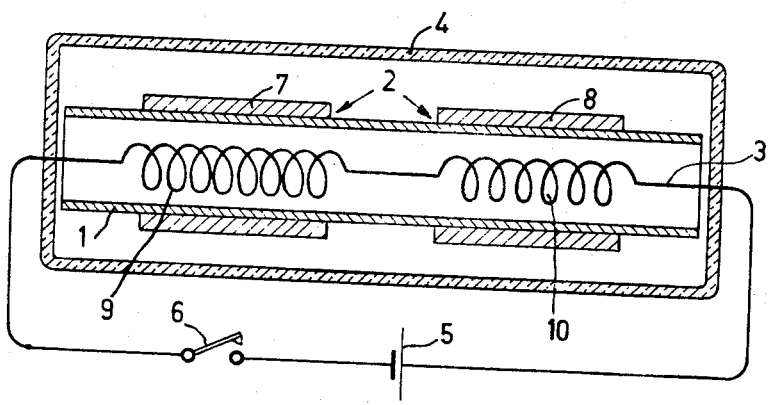
Figure 2:
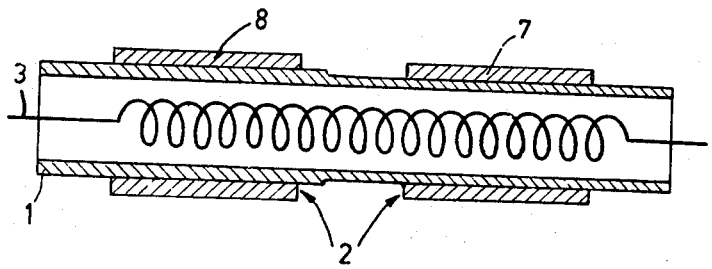
Figure 3:
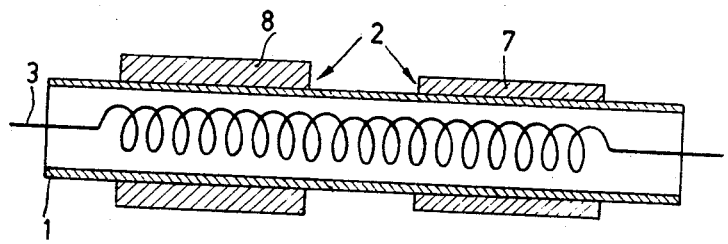
Figure 4:
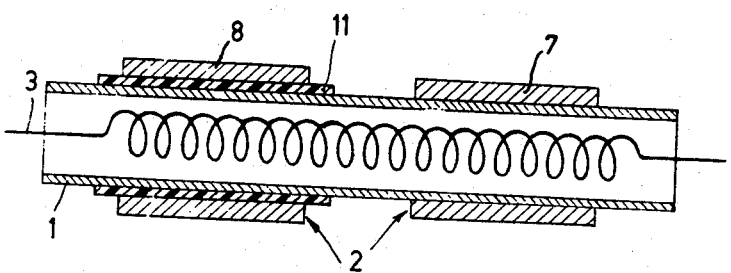

In FIG. 1 the heating of the part 7 is effected more rapidly than that of the part 8 because a part 9 of the turns of the filament 3 are wound with a smaller pitch than the part 10. In FIG. 2, the pitch of the filament is the same everywhere but the support 1 has a larger wall thickness at the place where the surface layer 8 is provided than at the place which is coated with the layer 7. In FIG. 3, the active layer 8 has a larger thickness than the active layer 7. Between the active layer 8 in FIG. 4 and the support 1 a sleeve 11 of heat-resistant insulation material is provided.

Figure 5:
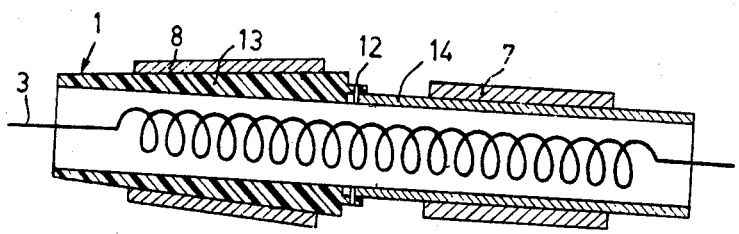

Of the apparatus according to the invention, FIG. 5 shows the embodiment which is to be preferred for structural reasons. The support 1 is constituted by two axial sections 13, 14 of the tube which are connected by sliding one section of the tube into the other after which the two sections are secured together by a spot weld 12. One section 13 of the tube is coated with the layer 8 of active substance and has an increasing thickness from the free end towards the place where the sections 13 and 14 of the tube are connected together. The layer 8 which is provided on the section 13 of the support 1 logically extends according to a sleeve in the form of a truncated cone, the largest aperture of which is directed to the connecting section 14 of the tube which is coated with the layer 7. So more supporting material and also more active substance must be heated on the side which is directed towards the section 14 of the support which becomes warm more rapidly so that the heat which is applied from the warmer section is quite evenly distributed. The section 14 of the tube supports the layer 7 and is a cylindrical tube of constant thickness. This arrangement enables a delay of luminescence of the part 8 with respect to the part 7.

The results obtained are shown in the graphical representations shown in FIGS. 6 and 7. In FIG. 6 a film 15 is used for recording the luminescence. The shadow band 16 is produced by luminescence of the layer 7 and the shadow band 17 by luminescence of the layer 8. The time $t$ is plotted on the ordinate. The photographic film is moved at constant speed along the material layers 7 and 8, the said layers being heated. On the negative thus formed the various parts will appear in a blacker condition according as they have received more light.

FIG. 7 shows a recorded image of the luminescence intensity when an oscillograph is used. The amplitude D is shown of the luminescence of each of the layers 7 and 8 of the luminescent substance. The various peaks in the thermo-luminescence which are of importance for the measurement of the dose are denoted by I, II and III and I, II and III. These representations show the delay with which the heat penetrates into the layers 7 and 8. With a larger delay it can be reached that the second peak of the luminescence in the layer 8 falls outside the area of the luminescence in the layer 7.

In practice the difference in the conduction of heat to the layers 7 and 8 has for its result that the layer 7 can be heated and the luminescence measured without the layer 8 reaching the temperature required for that purpose. In order to establish the luminescence of the layer 8 after radiation, it is necessary only to continue heating somewhat longer.

In the above described cases the same thermo-luminescent substance has been used for the layers 7 and 8 which substance can be provided simultaneously by coating the whole support; separation of the two layers is effected afterwards by removing the excessive material.

What is claimed is:

1. A thermo-luminescent dosimeter comprising a radiation permeable envelope, a support within said envelope, an active element on said support, said active element comprising two portions each of a thermo-luminescent substance which absorbs the radiation energy, and means to heat said support, the resistance against a rise in temperature of the surface of the two portions of the active element being different whereby the information collected by each part at different instants can be withdrawn so that one of the substances can indicate the total radiation received successively by the apparatus.

2. A thermo-luminescent dosimeter as claimed in claim 1, in which the active substance of the two portions of said active element is the same and is provided on a common support.

3. A dosimeter as claimed in claim 2, in which the support is tubular and comprises a filament which is helically wound around an axis which is coaxial with the axis of the tube.

4. A dosimeter as claimed in claim 2, in which the heating means is a wound filament having two portions corresponding to each active element portion, the pitch of the turns of one filament portion differing from the pitch of the turns of the other filament portion.

5. A dosimeter as claimed in claim 1, in which the thickness of the support of the thermoluminescent substance of one portion differs from the thickness of the support of the other portion.

6. A dosimeter as claimed in claim 5, in which the thickness of the support of the thermo-luminescent substance of one portion increases linearly from the free end of the support to the other portion.

7. A dosimeter as claimed in claim 2, in which the thermo-luminescent substance of one portion is directly provided on the support and the thermo-luminescent substance of the other portion is provided with the interposition of a heat-insulating layer.

8. A dosimeter as claimed in claim 2, in which the thickness of the thermo-luminescent substance of one portion differs from the thickness of the active substance of the other portion.

9. A dosimeter as claimed in claim 1, in which the two portions are provided in an evacuated envelope.

References Cited

UNITED STATES PATENTS

| 2,616,051 | 10/1952 | Daniels | 250—71 |
| 3,115,578 | 12/1963 | Schulman | 250—71 |
| 3,141,973 | 7/1964 | Heins et al. | 250—83 |

ARCHIE R. BORCHELT, *Primary Examiner.*

U.S. DEPARTMENT OF COMMERCE
PATENT OFFICE

UNITED STATES PATENT OFFICE
CERTIFICATE OF CORRECTION

Patent No. 3,408,495                          October 29, 1968

Raymond Schayes et al.

It is certified that error appears in the above identified patent and that said Letters Patent are hereby corrected as shown below:

In the heading to the printed specification, line 11, "659,086" should read -- 8415 --.

Signed and sealed this 3rd day of March 1970.

(SEAL)
Attest:

Edward M. Fletcher, Jr.                    WILLIAM E. SCHUYLER, JR.

Attesting Officer                           Commissioner of Patents